(12) United States Patent
Tatapudi et al.

(10) Patent No.: US 10,742,489 B2
(45) Date of Patent: Aug. 11, 2020

(54) VALIDATING NETWORK CONFIGURATION USING SHADOW DATABASES

(71) Applicant: HEWLETT PACKARD ENTERPRISE DEVELOPMENT LP, Houston, TX (US)

(72) Inventors: Suryanarayana Tatapudi, Santa Clara, CA (US); Michael Zayats, Santa Clara, CA (US); Aslam Khan, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 48 days.

(21) Appl. No.: 16/177,511

(22) Filed: Nov. 1, 2018

(65) Prior Publication Data
US 2020/0145284 A1 May 7, 2020

(51) Int. Cl.
*H04L 12/24* (2006.01)
*G06F 9/30* (2018.01)
(Continued)

(52) U.S. Cl.
CPC ........ *H04L 41/0803* (2013.01); *G06F 9/3009* (2013.01); *G06F 16/2379* (2019.01);
(Continued)

(58) Field of Classification Search
CPC ............. H04L 41/0803; H04L 41/0869; H04L 41/0863; G06F 16/27; G06F 16/2379; G06F 9/3009
See application file for complete search history.

(56) References Cited

U.S. PATENT DOCUMENTS 8,832,241 B2   9/2014  Mithyantha
9,699,029 B2   7/2017  Guntaka et al.
(Continued)

FOREIGN PATENT DOCUMENTS

WO    01/90843 A2    11/2001

OTHER PUBLICATIONS

Himura, Y. et al., "Static Validation of Network Device Configurations in Virtualized Multi-tenant Datacenters", (Research Paper), International Symposium on Integrated Network Management, 2013, 9 pages.

*Primary Examiner* — Michael A Keller
(74) *Attorney, Agent, or Firm* — Nolte Intellectual Property Law Group

(57) ABSTRACT

Networks that support business operations may be a complex combination of computers used by end-users, wired connections, wireless connections, and a multitude of infrastructure devices. Some of the infrastructure devices may be critical components in the operation of the network. Disclosed method and system provide for validation, deployment and rollback of configuration changes to network infrastructure components among other things. A computer device may include a network controller, memory storage for instructions and configuration database. A shadow database may be created to execute in parallel with the primary database service process, the shadow database instance comprising a shadow database control process and associated shadow database configuration information independently updatable from the configuration database information. Change validation may be performed using the shadow database without impact to the run-time configuration database.

18 Claims, 10 Drawing Sheets

(51) Int. Cl.
*G06F 16/27* (2019.01)
*G06F 16/23* (2019.01)

(52) U.S. Cl.
CPC .......... *G06F 16/27* (2019.01); *H04L 41/0863* (2013.01); *H04L 41/0869* (2013.01)

(56) References Cited

U.S. PATENT DOCUMENTS

| | | | |
|---|---|---|---|
| 2010/0211548 A1* | 8/2010 | Ott | G06F 16/27 707/655 |
| 2013/0073513 A1* | 3/2013 | Kemper | G06F 16/28 707/600 |
| 2014/0040182 A1* | 2/2014 | Gilder | G06Q 40/12 707/602 |
| 2014/0122855 A1 | 5/2014 | Maneval | |
| 2015/0193464 A1* | 7/2015 | Kwon | G06F 16/1815 707/648 |
| 2018/0285211 A1* | 10/2018 | Eberhard | G06F 11/1469 |

* cited by examiner

VALIDATING NETWORK CONFIGURATION USING SHADOW DATABASES

BACKGROUND

Networks of computers that support of business activities are often composed of a multitude of infrastructure devices. These infrastructure devices may provide, for example, a method of combining several physically different networking technologies to appear virtually as one cohesive network. The infrastructure devices may also provide methods of controlling the flow of data to ensure the network operates securely and efficiently. Data flow between network-aware applications and services may be "invisibly" facilitated, in part, by these network infrastructure devices. Examples of network infrastructure devices may include but are not limited to load-balancers, routers, switches, and firewalls. These infrastructure devices may be referred to in this disclosure as simply "network communication devices" and are often critical to network operations. Devices critical to the network infrastructure generally are deployed with redundancy, for example, to prevent a single point of failure in the network. A redundancy, for example, may mean, that multiple devices are deployed where at least one is active and at least one is in a "hot stand-by" mode, ready to take over should the primary device fail. Sometimes, a single network communication device may act as a standby (or backup) for more than one primary device.

Failures of critical networking infrastructure devices are not limited to functional failure due to hardware and may also experience a software error or malfunction because of a failed configuration setting. Any network, regardless of complexity or size, may need maintenance and configuration changes as the networking needs for the entity operating the network evolve. Updates to configuration may include incorporating new networking devices, linking new networks to the existing network, or even simply removing devices that are obsolete. Configuration changes to existing infrastructure devices are one aspect of this maintenance, and the changes are often applied to a multitude of devices nearly instantaneously (e.g., a single configuration change may impact multiple network communication devices). These configuration changes to infrastructure devices, if done improperly, may inadvertently cause a network failure. Failures due to misconfiguration may be avoided through techniques that allow for testing and/or pre-validation of proposed configurations (e.g., after applying a configuration change). In the event pre-validation does not prevent a misconfiguration of a network infrastructure device, the negative effects of the misconfiguration may be mitigated by allowing infrastructure devices to recall and apply the previously known-working configuration (e.g., perform a "rollback" to a previous configuration).

BRIEF DESCRIPTION OF THE DRAWINGS

The present disclosure may be better understood from the following detailed description when read with the accompanying Figures. It is emphasized that, in accordance with standard practice in the industry, various features are not drawn to scale. In fact, the dimensions or locations of functional attributes may be relocated or combined based, on, design, security, performance, or other factors known in the art of computer systems. Further, order of processing may be altered for some functions, both internally and with respect to each other. That is, some functions may not require serial processing and therefore may be performed in an order different than shown or possibly in parallel with each other. For a detailed description of various examples, reference will now be made to the accompanying drawings, in which.

DETAILED DESCRIPTION

Figure 1A:
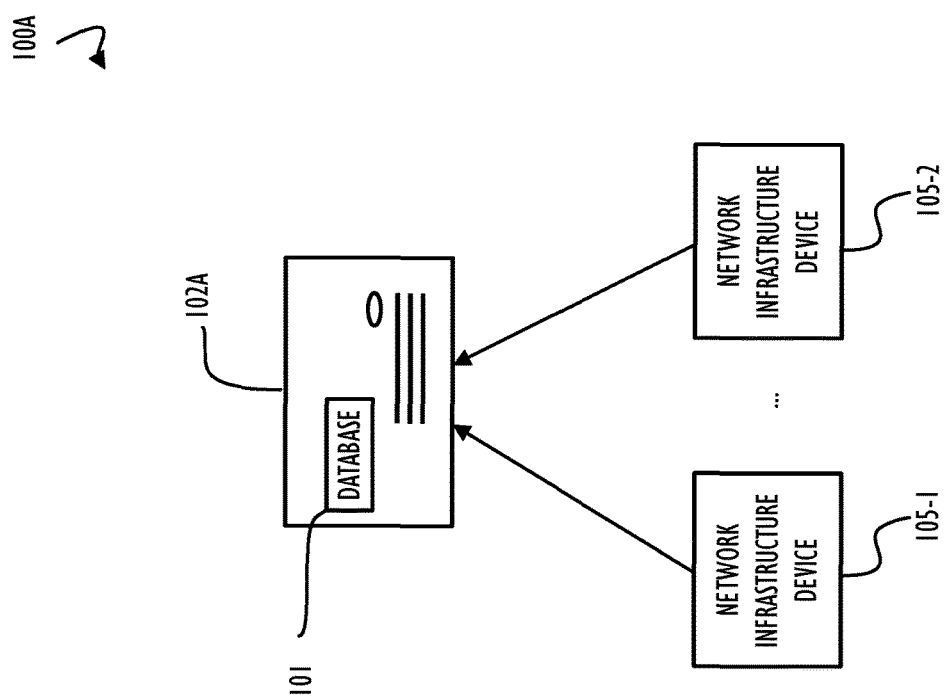
FIG. 1A is a functional block diagram illustrating multiple network infrastructure devices accessing a central configuration database, according to one or more disclosed implementations.

Examples of the subject matter claimed below will now be disclosed. In the interest of clarity, not all features of an actual implementation are described for every example implementation in this specification. It will be appreciated that in the development of any such actual example, numerous implementation-specific decisions may be made to achieve the developer's specific goals, such as compliance with system related and business-related constraints, which will vary from one implementation to another. Moreover, it, will be appreciated that such a development effort, even if complex and time-consuming, would be a routine undertaking for those of ordinary skill in the art having the benefit of this disclosure.

Networks of computers that support of business activities are often composed of a multitude of infrastructure devices.

These infrastructure devices may provide, for example, a method of combining several physically different networking technologies to appear virtually as one cohesive network. The infrastructure devices may also provide methods of controlling the flow of data to ensure the network operates securely and efficiently. Data flow between network-aware applications and services may be "invisibly" facilitated by these network infrastructure devices. Examples of network infrastructure devices may include but are not limited to load-balancers, routers, switches, and firewalls. These infrastructure devices may be special-purpose computing devices or they may be general purpose computing devices configured to operate as a network infrastructure device. These infrastructure devices may be critical to network operations and infrastructure devices supporting network communications may be referred to as simply, "network communication devices."

Configurations of network infrastructure devices may be stored in a centralized database. Multiple infrastructure devices, acting as clients to this centralized database, may access this database to obtain operational configuration data. This operational configuration data may be utilized, for example, to dictate how the infrastructure device functions. In other examples, the configuration information in the centralized database may be utilized to validate configurations before being committed to change, how the infrastructure device functions. In yet another example, a copy of the configuration information in the centralized database may be treated as a "checkpoint" or "snapshot" of the configuration data used to quickly recover a known-good state of a functional network configuration (e.g., perform a roll-back to a known good configuration). The concept of a checkpoint or snapshot in this context is to make a substantially complete copy of the centralized configuration database and retain that copy for an indeterminate amount of time. For example, a number of previous states of configuration may be maintained or a previous state may be stored for a period of time prior to considering the current state as a "known good state." The concept and, use of the "checkpoint" or "snapshot" are well known to those skilled in the art and therefore further discussion of the use of these concepts is beyond the scope of this disclosure. In short, checkpoints or snapshots may be complete copies or delta copies of previous configurations and implemented via local storage on each device, a central configuration repository, or a combination of these techniques.

There are many different, use cases where the disclosed techniques for creating a shadow database may be utilized to implement an improvement to the art of network administration and improve the overall functioning of a computer network. Specifically, one use case may involve a "dry-run" or testing of a proposed configuration change. For example, a network infrastructure device may be supporting a critical network infrastructure so testing a change may be implemented using a shadow database technique rather than altering the actual run-time production configuration. That is, a customer may want to try out a configuration, such as adding a new configuration setting, before actually deploying, that configuration. Accordingly, by testing the configuration change on a shadow copy that is not actually providing run-time information to the network infrastructure device, if something unforeseen were to occur during the test, the system may not be severely impacted (or may not be impacted at all). In other words, by creating a shadow database instance which is basically a copy of the original, the shadow database can be used to do the checkpointing rather than a production version of the database. This database may contain attributes of the device itself and the hardware of the device, along with network attributes that are needed for the network infrastructure device to perform its function (including access control lists (ACLs) which may be large in size). Creation of the shadow database instance may be performed on demand, for example, whenever a performance checkpoint is desired, or a validation process is to be performed.

To summarize a possible work flow, the network switch may be up and running to control a network. A system administrator may connect to the device to perform an, administrative action. For example, the system administrator may connect via a command line interface (CLI). After connection, a shadow database instance may be requested and the CLI may be used to alter the shadow instance to perform the dry-run test. As part of their testing, nothing is being written to the run-time production database (because changes are localized to the shadow instance). After the test is complete, the system administrator may simply shut down their test (and possibly disconnect from the CLI). The system administrator may, based on the results of the test, subsequently attach to a production database instance to apply their already validated changes to the production side rather than the test side. In this manner, shadow database instances may be used to perform validation of a proposed configuration change to a network infrastructure device.

Under some conditions, a central configuration database, when used by a multitude of network infrastructure devices, may have trouble facilitating a multitude of read and write requests arriving in an unpredictable order from multiple network infrastructure devices. This read and write contention that may be encountered when multiple devices attempt to access a shared resource, such as the central configuration database. Database contention may be a common issue for some network configurations. One infrastructure device, for example, requesting a checkpoint of the central configuration database may cause a complete copy of the central configuration database to be created. In some cases, that may mean that all other network infrastructure devices would not be allowed to access the central configuration database until the copy is complete. Accordingly, one benefit realized by the techniques of this disclosure includes reducing or eliminating the need for other network infrastructure devices to wait until the copy of the central configuration database is complete. This is, in part, because disclosed techniques use a fork of a process, for example a Linux process, to create a second shadow database instance nearly instantaneously and only create separate data portions of the databases (e.g., original and shadow) as updates are applied to either the original database instance or the new shadow instance.

Accordingly, to avoid multiple devices contending for access to the central configuration database, the techniques of this disclosure, in some embodiments, may utilize a memory copy-on-write feature implemented as part of an operating system feature known as the "fork". The fork concept, simply put, copies (or splits) an existing process into two identical processes that may then deviate at run-time after completion of the fork. In some cases, different processes created by a fork may be referred to as "threads." However, threaded processes typically return to a common process and are used to perform parallel processing for a parent process. In contrast, a process that simply "forks" may never return to any parent process and will complete its processing independently. Thus, threads may be considered to represent a subset of processes that may be created by a "fork" system feature.

To clarify the examples presented in this disclosure, a brief non-limiting description of the "fork" concept is described here as an instruction (e.g., operating system level instruction invoked from an application) executed by a running process. A running process, in this context, refers to how an operating system organizes multiple programs running concurrently. The operating system may allocate each program a process identification and then associate a portion of memory with that process identification (RID). The association of PID and memory portion will be used by the OS to control, for example, the executable program code, a portion of memory to store state information that controls the execution of the program, and other system resources used during the execution of the program. When a process executes the fork instruction, the operating system creates a copy of the portion of memory of the forking process required to resume execution of a new exact copy the process (and creates a new unique RID for the forked process). This new copy of memory may include but will not be limited to data such as executable instructions, initialized data values necessary for the configuration and maintaining running state of the program, and handles to allocated system resources. The original copy of the process and the new copy of the process may initially share access to areas of the program memory commonly understood to be dynamically allocated memory. This area of dynamic allocation may be created as a program associated with a process executes in accordance with the logic followed by the program code. One example of how dynamically allocated memory may be utilized, in the context of a network infrastructure device, includes obtaining a portion of memory for a process to read and write data records to manage a centralized configuration database.

Organizing data where one copy of the data is centrally shared across multiple devices may include techniques to control the consistency of the data both for reading and writing. As an example of how this consistency is controlled, consider when two processes simultaneously attempt to access the central database. Process A may attempt to write an update to the central database at the same time as Process B may be attempting to read data from the central database. The order of the arrival and execution of requests is non-deterministic as is the amount of time that is required to execute each request. The request to write from Process A may get executed first and therefore the request from Process B may be forced to wait, until Process A's write is complete. Process B may also be forced to wait to ensure it does not retrieve data that was only partially written by Process A. In some cases, in accordance with the example, a single process, implementing a write may take a relatively long time with respect to performance criteria. This specific example uses only two processes for simplicity in explanation. In a real world scenario, there may be multiple, processes simultaneously making requests read or write while a request is currently executing. As each subsequent waiting request is selected for execution, the other waiting requests may be required to wait for the currently executing request to complete. The amount of time a request must wait to begin execution may therefore be the sum of several previously executed requests that arrived nearly simultaneously. This type of access may lead to unpredictable response times for different client devices or client processes attempting to access a centrally controlled repository.

Utilizing the fork instruction, an implementation of a centrally shared database may avoid the need for requests to wait for operations including but not limited to checkpoints and configuration validation. The fork instruction may be utilized to create a new process on demand in response to a network infrastructure device attempting to access (e.g., read and/or write) the central configuration database. The new process, in accordance with disclosed techniques, may be created on demand by the network infrastructure device and may be dedicated to servicing the request(s) of the network infrastructure device that requested (or caused invocation of) the new process. In this example implementation, upon completion of the fork, an exact copy of the centralized configuration database may be accessible to both the original process and the new process as part of the shared portion of memory previously discussed. The new process may then utilize the shared copy of the configuration database and this newly created shared copy may be considered a "shadow copy" in accordance with disclosed techniques. A shadow copy, in this context, refers to the ability to have access to the memory containing the central configuration database instead of needing to fully duplicate the contents of the memory. The ability for the new process to use the shadow copy may avoid the time required to duplicate the memory, thus providing access to the centralized configuration database by a network infrastructure device without the need to wait for the full copy to complete.

Utilizing the shadow copy, each new process dedicated to an external network infrastructure device (or internal client application in a multi-client local data base scenario) may simultaneously perform read and write operations on the centralized configuration database without the need to wait for requests from other devices to complete. As described previously, each process having forked from a main process controlling the centralized configuration database now has a dedicated copy of the database via the shadow copy. Due to each network infrastructure device utilizing, a dedicated process, each device (or client application), acting as a client to the database, may serially perform any combination of read or write operations without regard for operations being performed by other clients. Read operations may be performed on the copy of the centralized configuration database shared among processes up until at least one process attempts to write a change to the central database.

The previously discussed memory copy-on-write feature, utilized by the operating system as part of the fork instruction, may be utilized to isolate changes (e.g., write updates) each process makes to the shadow copy of the centralized configuration database by creating a copy of the changed portion of memory. The memory containing the changed portion of the shadow copy may then be available for modification only to the process that made the change. Other memory portions of the shadow copy that are not affected by the changed portion of memory may remain shared across all active processes. The time taken to perform a copy of the changed portion of memory may be significantly smaller than the time that would be required to duplicate the entire centralized configuration database. This potentially significantly smaller time may significantly reduce the amount of time simultaneous requests may need to wait before accessing information in the centralized configuration database.

Having an understanding of the above overview, this disclosure will now explain a non-limiting but detailed example implementation. This example implementation is explained with reference to the figures that include: a functional block diagram showing multiple network infrastructure devices accessing a central configuration database and a functional block diagram of an example network infrastructure device (e.g., switch/router) (FIGS. 1A-B); a functional block diagram illustrating multiple network infrastructure devices creating a shadow copy of the centralized configuration database on demand and an alternate implementation where a multi-client configuration uses a shared local configuration database (FIGS. 2A-B); a flow chart illustrating a network infrastructure device creating a shadow copy of the centralized configuration database on demand (FIG. 3); an example processor and computer-readable medium used to implement a network infrastructure device causing instantiation of a shadow copy of the centralized configuration database on demand (FIG. 4); a flow chart illustrating a network infrastructure device, utilizing a shadow copy of the centralized configuration database (FIG. 5); an example processor and computer-readable medium to implement an infrastructure device utilizing a shadow copy of the centralized configuration database (FIG. 6); a computer network infrastructure that may be used to implement all or part of the disclosed-technique for utilizing a shadow copy of a centralized configuration database (FIG. 7); and an example, processing device that may be used in one or more devices that may implement the disclosed techniques for utilizing a shadow copy of the centralized configuration database (FIG. 8).

Referring to FIG. 1A, an example block diagram 100A illustrates a centralized configuration database 101 containing configuration data for or more network infrastructure devices. As illustrated, configuration database 101 may be stored on a device 102A accessible to a plurality of remote devices. Device 102A may be a network infrastructure device or may simply be a computer device configured to provide a database service. Devices that may be considered a network infrastructure device may include load-balancers, routers, switches, firewalls, or other network connected devices that may provide services required for controlling data flow across a network. Some network infrastructure devices may provide a combination of functions provided by other network infrastructure devices. In FIG. 1A, block diagram 100A illustrates a plurality of network infrastructure devices 105 that refer to centralized configuration database 101. Block diagram 100A represents a depiction of a single centralized database 100 and is not intended to limit all implementations of the central configuration database to a single instance of the database. Techniques may be employed to create a central configuration database that has no single point of failure to prevent network failure in the event of a device hosting the central configuration database fails. These techniques are understood with respect to making a critical resource highly available. Any high availability techniques may be used in conjunction with disclosed implementations, but for simplicity, may not be specifically discussed when explaining the examples in this disclosure.

Figure 1B:
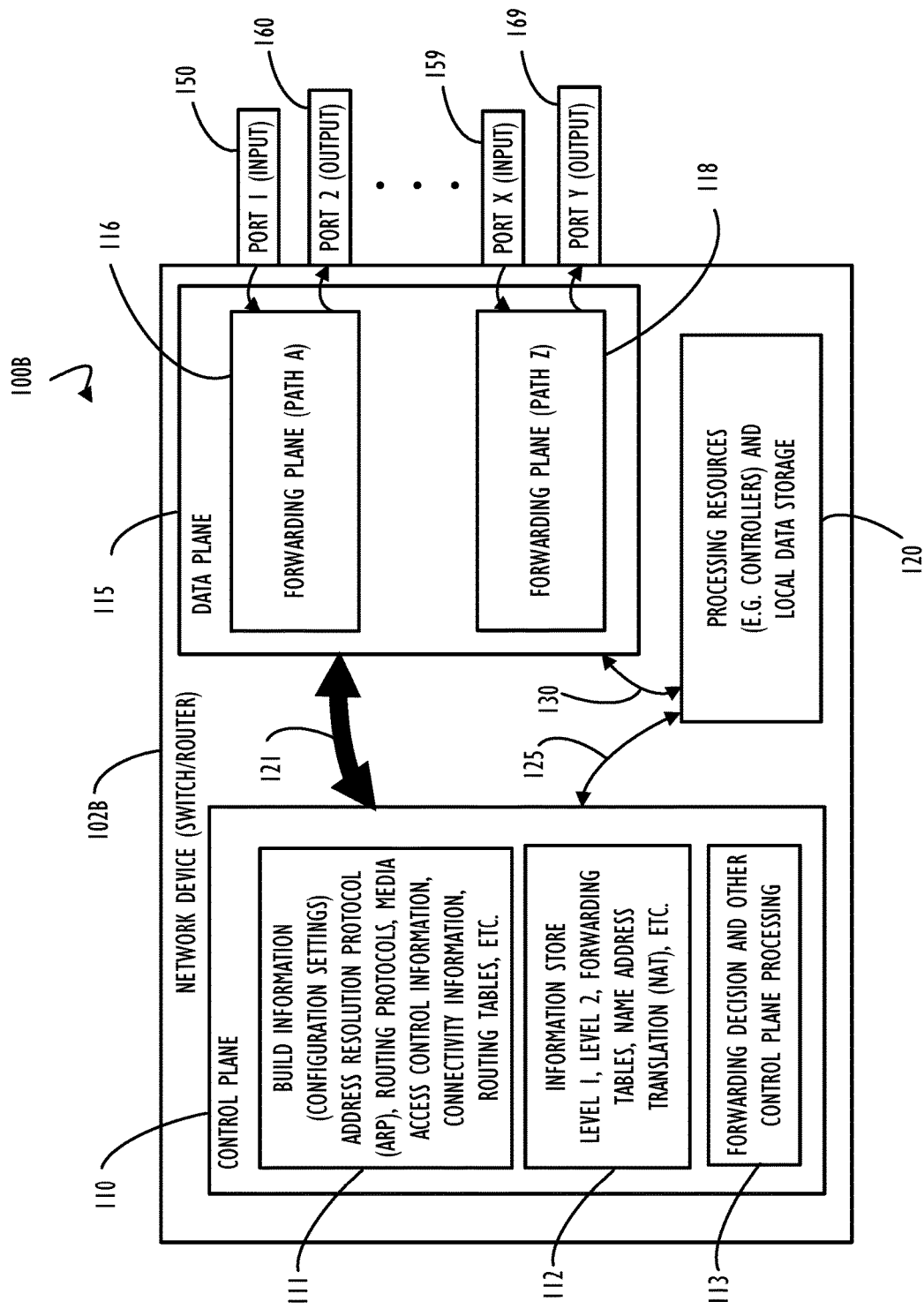
FIG. 1B is a is a block diagram representing functional modules and functional components of a switch/router as an example of a network infrastructure device, according to one or more disclosed implementations.

Referring now to FIG. 1B, a network infrastructure device such as a switch/router 102B is illustrated as an example in block diagram 100B. In general, a router has two types of network element components organized onto separate planes illustrated as control plane 110 and data plane 115. In, addition, a typical switch/router 102B may include processing resources and local data storage 120. Depending on the capabilities of a particular switch/router 102B different types of processing resources and local storage may be present. In general, higher capacity router/switch 102B implementations will include substantial processing resources and memory while simpler (e.g., low capacity) devices will contain less internal resources.

Control plane 110, for example in a router may be used to maintains routing tables (or a single comprehensive routing table) that list which route should be used to forward a data packet, and through which physical interface connection (e.g., output ports 160 through 169). Control plane 110 may perform this function by using internal preconfigured directives, called static routes, or by learning routes dynamically using a routing protocol. Static and dynamic routes may be stored in one or more of the routing tables. The control-plane logic may then strip non-essential directives from the table and build a forwarding information base (FIB) to be used by data plane 115. Although ports in this example are illustrated as input or output, in practice ports are generally used for both input and output.

A router may also use a forwarding plane 116 (e.g., part of the data plane 115) that contains different forwarding paths for information from different ports or different destination addresses (e.g., forwarding path A shown in forwarding plane 116 or forwarding path Z shown in forwarding plane 118). In general, the router forwards data packets between incoming (e.g., ports 150-159) and outgoing interface connections (e.g., ports 160-169). The router forwards data packets to the correct network type using information that the packet header contains matched to entries in, the FIB supplied by control plane 110. Ports are typically bidirectional and are shown in this example as either "input" or "output" to illustrate flow of a message through a routing path. In some network implementations, a router (e.g., network infrastructure device switch/router 102B) may have interfaces for different types of physical layer connections, such as copper cables, fiber optic, or wireless transmission. A single router may also support different network layer transmission standards, Each network interface may be used to enable data packets to be forwarded from one transmission system to another. Routers may also be used to connect two or more logical groups of computer devices known as subnets, each with a different network prefix.

Also illustrated in FIG. 1B, bidirectional arrow 121 indicates that control plane 110 and data plane 115 may work in a coordinated fashion to achieve the overall capabilities of network infrastructure device switch/router 102B. Similarly, bidirectional arrow 125 indicates that processing and local data storage resources 120 may interface with control plane 110 to provide processing and storage support for capabilities assigned to control plane 110. Bidirectional arrow 130 indicates that processing and local data storage resources 120 may also interface with, data plane 115 as necessary.

Control plane 110, as illustrated in FIG. 1B, includes several example functional control blocks, Additional control blocks are possible depending on the capabilities of a particular implementation of a network device. Block 111 indicates that control plane 110 may have associated build information regarding a software version of control code that is currently executing on infrastructure network device switch/router 102B. In addition, that software version may include configuration settings to determine how network infrastructure device switch router 102B and its associated control code perform different functions.

Many different configuration settings for both the software and the device itself are possible and describing each is beyond the scope of this disclosure. However, the disclosed database shadow techniques may be designed to identify configuration settings designated for validation/testing while ignoring data values that are expected to maintain a constant value for a single network device. Block 111 indicates that routing information and connectivity information may be known to network device 102B and may be made available to control plane 110 or data plane 115 (e.g., via path 121 or as part of processing via paths 125 and 130). Block 112 similarly indicates that an information store may be accessible from control plane 110 and include forwarding tables or NAT information as appropriate. Block 113 indicates that control plan 110 may also be aware of forwarding decisions and other processing information. Although FIG. 1B illustrates these logical capabilities within control plan 110 they may actually be implemented outside of, but accessible to, control plane 110.

Figure 2A:
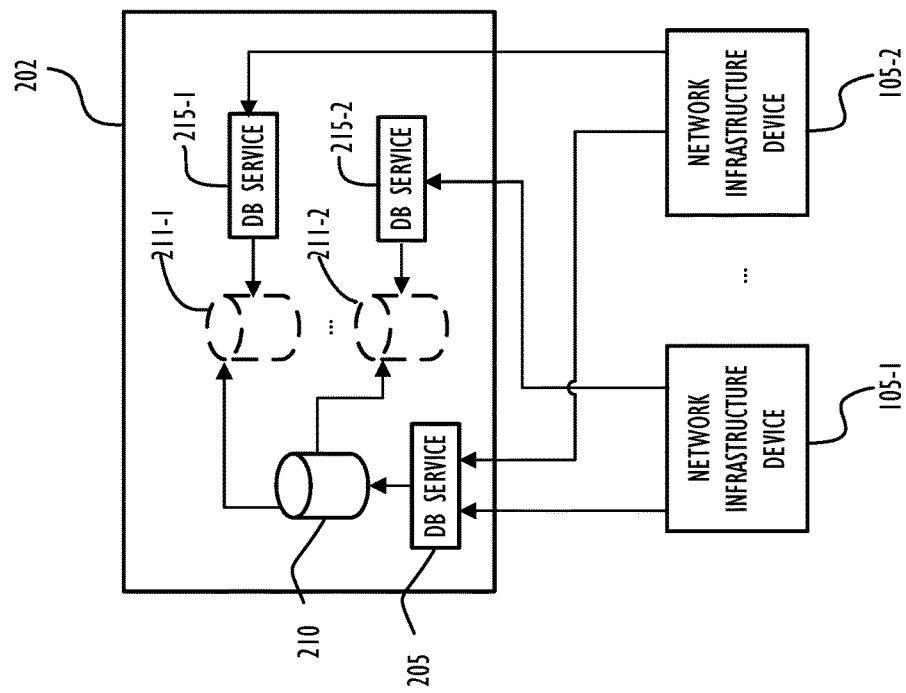
FIG. 2A is a functional block diagram illustrating multiple network infrastructure devices and creation of a shadow copy of the centralized configuration database on demand as might be necessary to validate a proposed configuration change according to one or more disclosed implementations.

Referring now to FIG. 2A, an example of a plurality of network infrastructure devices 105 utilizing a central configuration database system 202 (including storage and processing). This example depicts a centralized configuration database system 202 including a primary data access service 205 that may mediate access to data store 210 and a plurality of network infrastructure devices as clients 110. The primary database access service 205 may mediate commands from network infrastructure devices 110 such as reading from the database, writing to the database, or requesting a shadow copy 211 of the primary database 210. This example is intended to merely illustrate some of the operations the primary database service 205 may provide, additional services are also possible without deviating from the scope of this disclosure.

In this example, primary database service 205 may respond to requests made by network infrastructure devices 105 with data indicating write requests were successful, data resulting from read requests, or information that allows clients (e.g., network infrastructure devices 105 or client applications as explained below for FIG. 2B) to redirect service requests to additional DB service(s) 215 that may in turn mediate access to one or more shadow copies 211 of primary database 210. Further, the listed types of interactions only serve as an example of types of responses or interactions that could be performed with clients of configuration database system 202.

Primary database access service 205 may respond to requests from clients by creating a shadow copy 211 of the primary database 210. For example, a shadow copy 211 may be created by instructing the underlying operating system to fork a process associated with primary database access service 210 one or more times to create a corresponding number of new service processes 215 that share access to the memory space containing primary database 210. The concept of the shadow copy 211 of the primary database 210, in this example, may be achieved by the operating system of the computing device providing database access service 205 by allowing services 215 to access the shadow copy 211 of the primary database 210 by sharing memory containing the database 210 among the primary service process 205 and the forked service processes 215. In this example, there are two forked service processes, specifically forked db service 215-1 and forked db service 215-2, each with a corresponding shadow copy 211-1 and 211-2, respectively. Any number of forked db service processes and shadow copies are possible.

Information contained in service responses (e.g., data base access requests) relating to directing a network infrastructure device 105 to connect to a shadow copy 211 of the primary database 210 may include data such as security tokens or port numbers where the shadow copy service 215 will accept a connection from a network infrastructure device 105. Each service 215 that mediates requests between network infrastructure devices 105 as clients and a corresponding shadow copy 211 of the primary database 210 may operate with the same functionally as the primary database access service 205. Clients 105 interacting with services 215 mediating access to shadow copies 211 may perform any operation as if the client were interacting with the primary database access service 205.

Figure 2B:
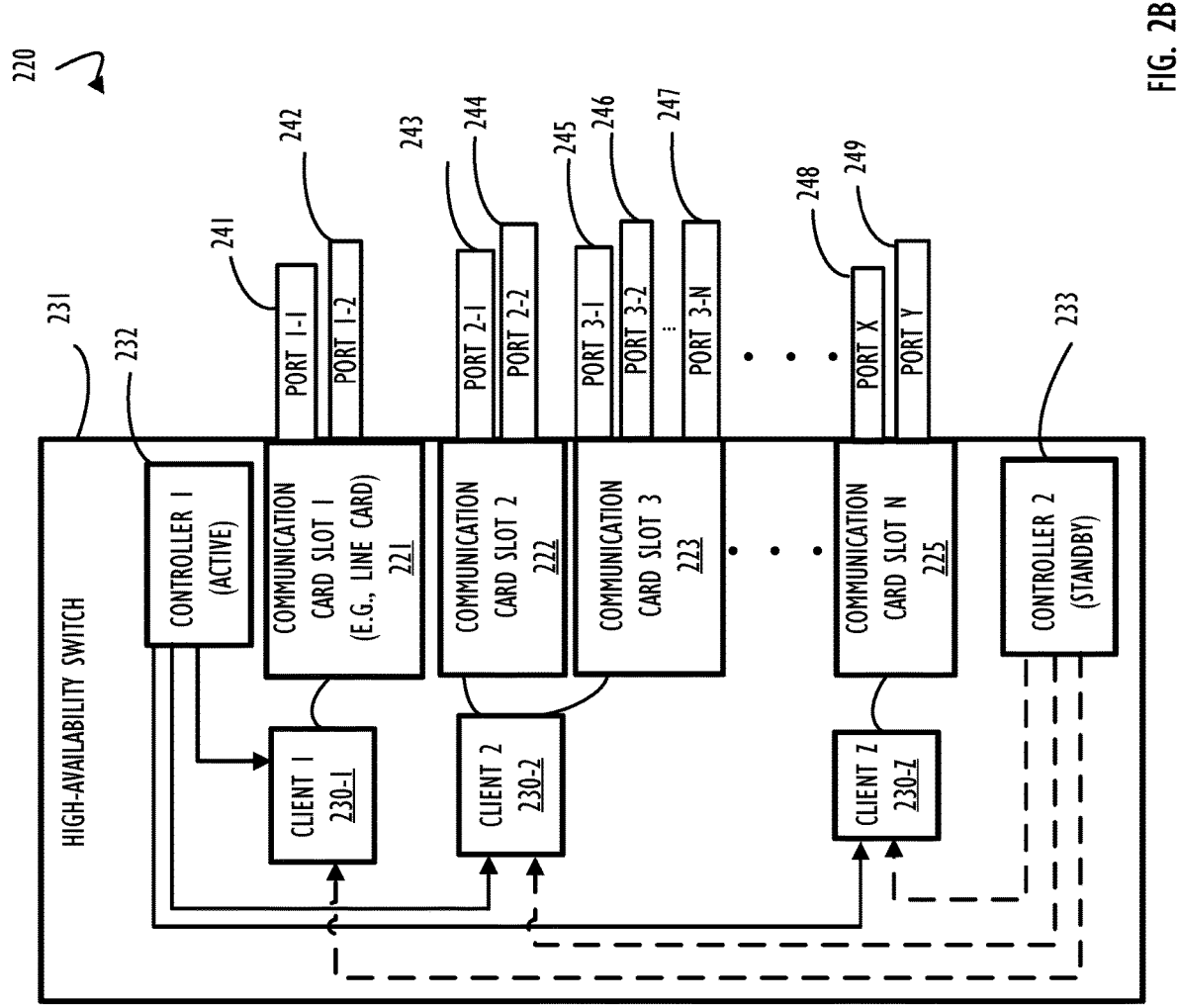
FIG. 2B is a function block diagram illustrating multiple client applications, executing locally on a single network infrastructure device, accessing a central configuration database (where the configuration database is central to a single device), according to one or more disclosed implementations.

Referring now to FIG. 2B, an example of a high-availability switch 231 is illustrated in block diagram 220. High-availability switch 231 is illustrated with two controllers. Controller 1 (232) is identified as the "active" controller and Controller 2 (233) is identified as the "standby" controller. As explained in more detail below, a high-availability switch, such as high-availability switch 231, may have any number of controllers and typically has at least two. In some configurations, the controllers work as a primary/backup pair with a dedicated active controller and a dedicated standby controller. In a primary/backup configuration, the primary performs all network functions and the standby, as its name suggests, waits to become the active if a failover condition is reached. Failover may be automatic or manual and will be discussed in more detail below. In general, failover at a high level refers to the active and standby switching roles so that the standby becomes the active and the active (typically after restarting) becomes the standby.

High-availability switch 231 also includes a plurality of communication cards (e.g., Card Slot 1 (221), Card Slot 2 (222), Card Slot 3 (223), and Card Slot N (225)) that may each have a plurality of communication ports configured to support network communication. A card slot, such as Card Slot 1 (221) may also be referred to as a "line card" and have a plurality of bi-directional communication ports (as well as a management port (not shown)). Card Slot 1 (221) is illustrated with port 1-1 (241) and port 1-2 (242) and may represent a "card" that is plugged into a slot (e.g., communication bus connection) of a backplane (e.g., communication bus) of high-availability switch 231. Other connections and connection types are also possible (e.g., cable connection). Also, in FIG. 2B, Card Slot 2 (222) is illustrated with port 2-1 (243) and port 2-2 (244); Card Slot 3 (223) is illustrated with ports 3-1 (245), 3-2 (246), and port 3-N (247); and Card Slot N (225) is illustrated with port X (248) and port Y (249).

To support communications between a controller (e.g., an active and/or a standby controller) in a switch and client devices connected to that switch, a number of communication client applications may be executing on a given switch. Client applications executing on a switch may assist in both: communication to connected clients, and configuration of hardware on the switch (e.g., ports of a line card). In some cases, client applications are referred to as "listeners," in part, because they "listen" for a communication or command and then process what they receive. Alternatively, or in addition, processes interacting with a data base may be called "publishers" and "subscribers," where subscribers receive information and publishers provide updates (e.g., writes) to information. Further, these client applications represent client applications that may request access to a shadow copy of a configuration database as discussed above. For high-availability switch 231, an example client application is client 1 (230-1) which is illustrated to support communication from either the active or the standby controller to devices connected through Card Slot 1 (221).

A second example client application in FIG. 2 is client 2 (230-2) which is illustrated to support communication from either controller to both of Card Slot 2 (222) and Card Slot 3 (223). Finally, client Z (230-Z) is illustrated to support communication from both controllers to Card Slot N (225). Dashed lines in block diagram 200 from standby controller 2 to client applications indicate that the standby controller may be communicatively coupled to a communication card slot via a client application but may not be transmitting significant data because of its standby status. Solid lines in block diagram 200 from active controller 1 to client applications indicate an active status with likely more communication taking place. Also note that a single client may be configured to support more than one (or even part of one) communication Card Slot (line card) as illustrated with client 2 (230-2) supporting both of Card Slot 2 (222) and Card Slot 3 (223) concurrently. Upper limits on the number of card slots supported by a client may be an implementation decision based on performance characteristics or other factors of the switch and its internal design.

As explained above, multiple client applications may require concurrent access to a configuration database (not shown in FIG. 2B) for high-availability switch. The configuration database may be implemented locally on the switch or may be remote to the switch as discussed above with reference to FIGS. 1A-B. In either case, a client application may interact with the configuration database in accordance with techniques for creating an on demand shadow copy of the database and corresponding forked database service process as discussed throughout this disclosure.

Figure 3:
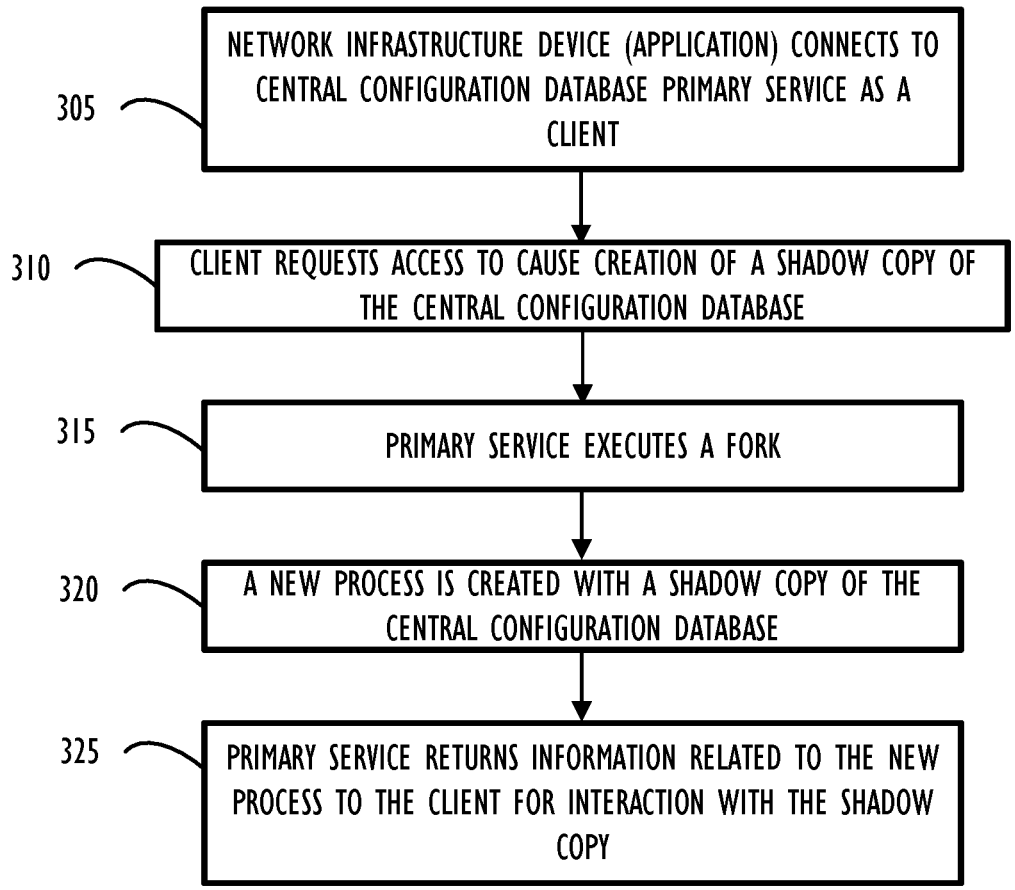
FIG. 3 is a flow chart illustrating a network infrastructure device creating a shadow copy of the centralized configuration database on demand, according to one or more disclosed implementations.

Referring now to FIG. 3, flow chart 300 illustrates an example of an implementation where a network infrastructure device creates a shadow copy of the centralized configuration database on demand. In accordance with this example, block 305 illustrates the network infrastructure device (or local client application that may in turn be associated with a client device) connecting to the central configuration database service as a client. Block 310 illustrates that, as a result of a client request, the primary database service creates a shadow copy of the centralized configuration database. Block 315 illustrates that the primary database service may create a new process (e.g., a db service associated with a shadow db copy) utilizing the fork system instruction. Block 320 illustrates that the result of the fork is to create a new process that shares the memory containing the centralized configuration database as a shadow copy. Block 325 illustrates that the primary database service returns information related to the creation of the new process to the client.

Figure 4:
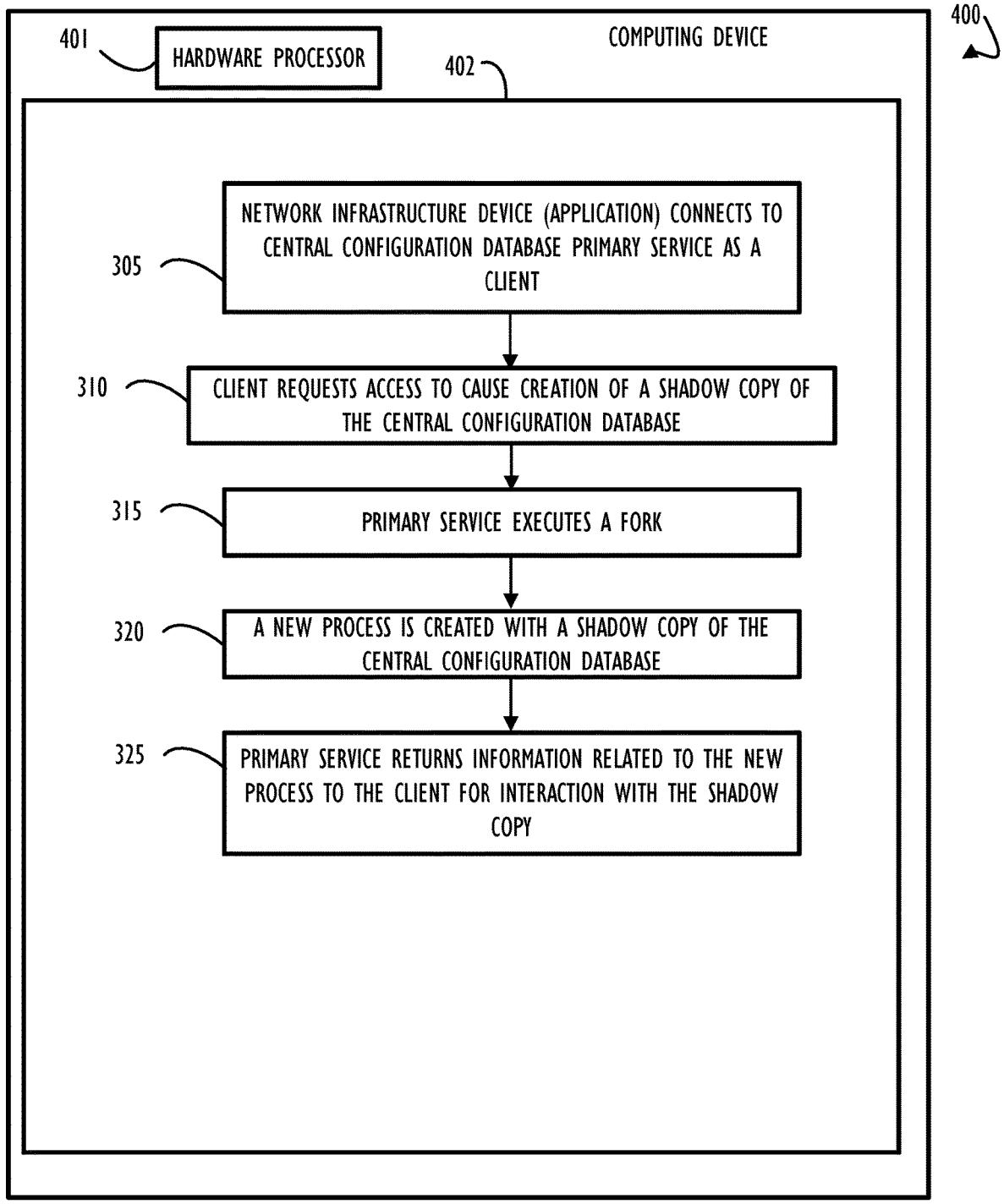
FIG. 4 is an example processor and computer-readable medium used to implement a network infrastructure device creating a shadow copy of the centralized configuration database on demand, according to one or more disclosed implementations.

FIG. 4 is an example computing device 400, with a hardware processor 401, and accessible machine-readable instructions stored on a machine-readable medium 402 for implementing the creation of a shadow copy of the centralized configuration database, according to one or more disclosed example implementations. FIG. 4 illustrates computing device 400 configured to perform the flow of method 300 as an example. However, computing device 400 may also be configured to perform the flow of other methods, techniques, functions, or processes described in this disclosure. In this example of FIG. 4, machine-readable storage medium 402 includes instructions to cause hardware processor 401 to perform blocks 305-325 discussed above with reference to FIG. 3.

A machine-readable storage medium, such as 402 of FIG. 4, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory (EPROM), random access memory (RAM), non-volatile random access memory (NVRAM), optical disk, solid state drive (SSD), flash memory chips, and the like. The machine-readable storage medium may be a non-transitory storage medium, where the term "non-transitory" does not encompass transitory propagating signals.

Figure 5:
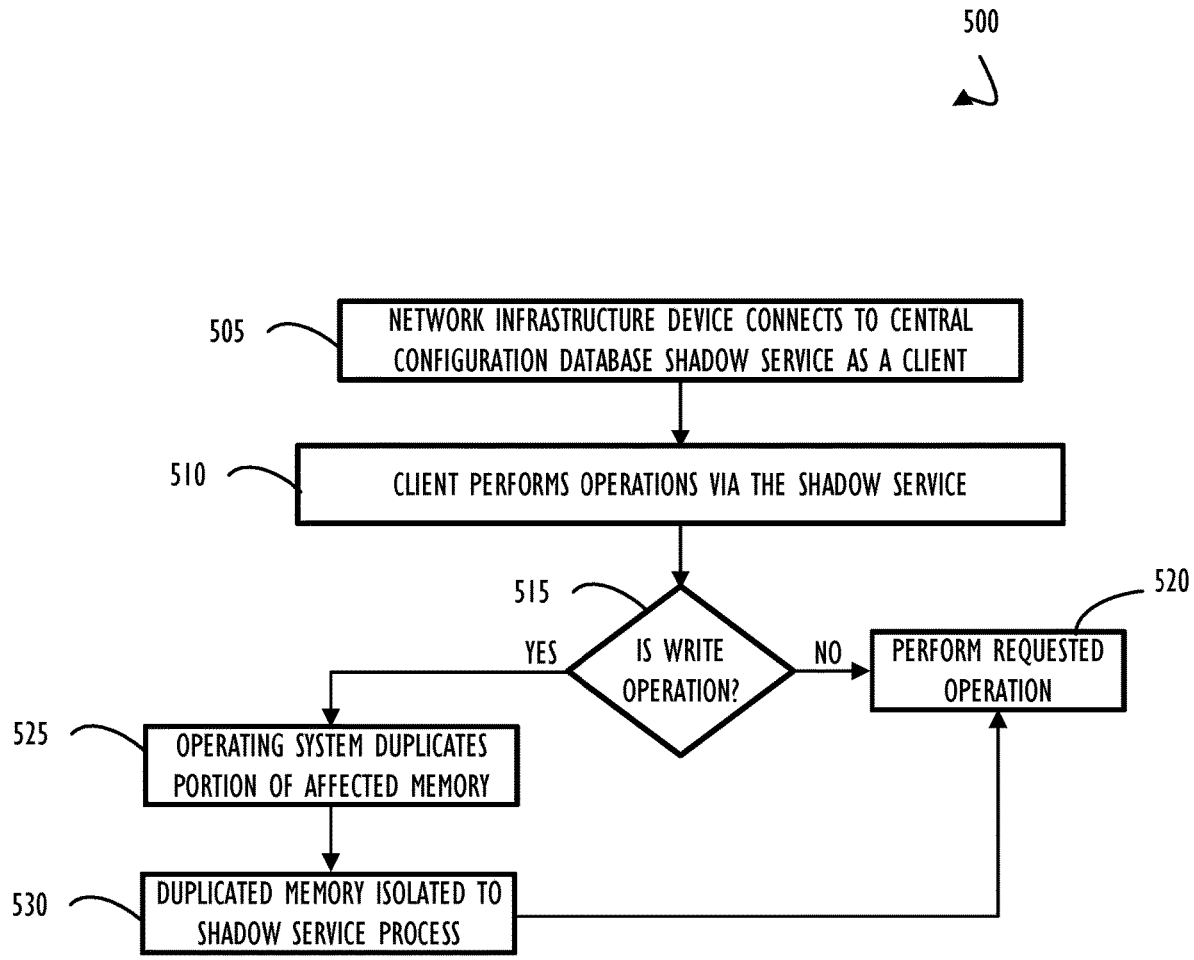
FIG. 5 is a flow chart illustrating a network infrastructure device utilizing a shadow copy of the centralized configuration database, according to one or more disclosed implementations.

Referring now to FIG. 5, flow chart 500 illustrates an example of an implementation where a network infrastructure device utilizes a shadow copy of the centralized configuration database that may have been previously created in accordance with flow chart 300 of FIG. 3. In accordance with this example, Block 505 illustrates that network infrastructure device (or client application in general) connecting to a service that provides access to the shadow copy of the centralized configuration database. Block 510 illustrates that the network infrastructure device, as a client connected to the service described in block 505, performs operations on the shadow copy of the database. Block 515 illustrates the decision made by the operating system when the client performs operations that access the shadow copy of the database. In this example, block 515 is used to determine if the operation requested by the client performs an operation that writes a change to the shadow copy of the centralized configuration database. In the event that there is no change to the shadow copy, the branch indicating "NO" is followed to block 520 where the requested operation is executed. In the event that the requested operation will cause a change to the shadow copy of the centralized configuration database, the branch indicating "YES" is followed to block 525. Block 525 illustrates that the operating system may duplicate the portion of the shadow copy of the database that is to be changed when executing the operation. Block 530 illustrates that the operating system assigned the duplicated portion of memory to the process that is performing the operation on the shadow copy of the database. Finally, block 530 transfers control to block 520 where the operation is completed.

Figure 6:
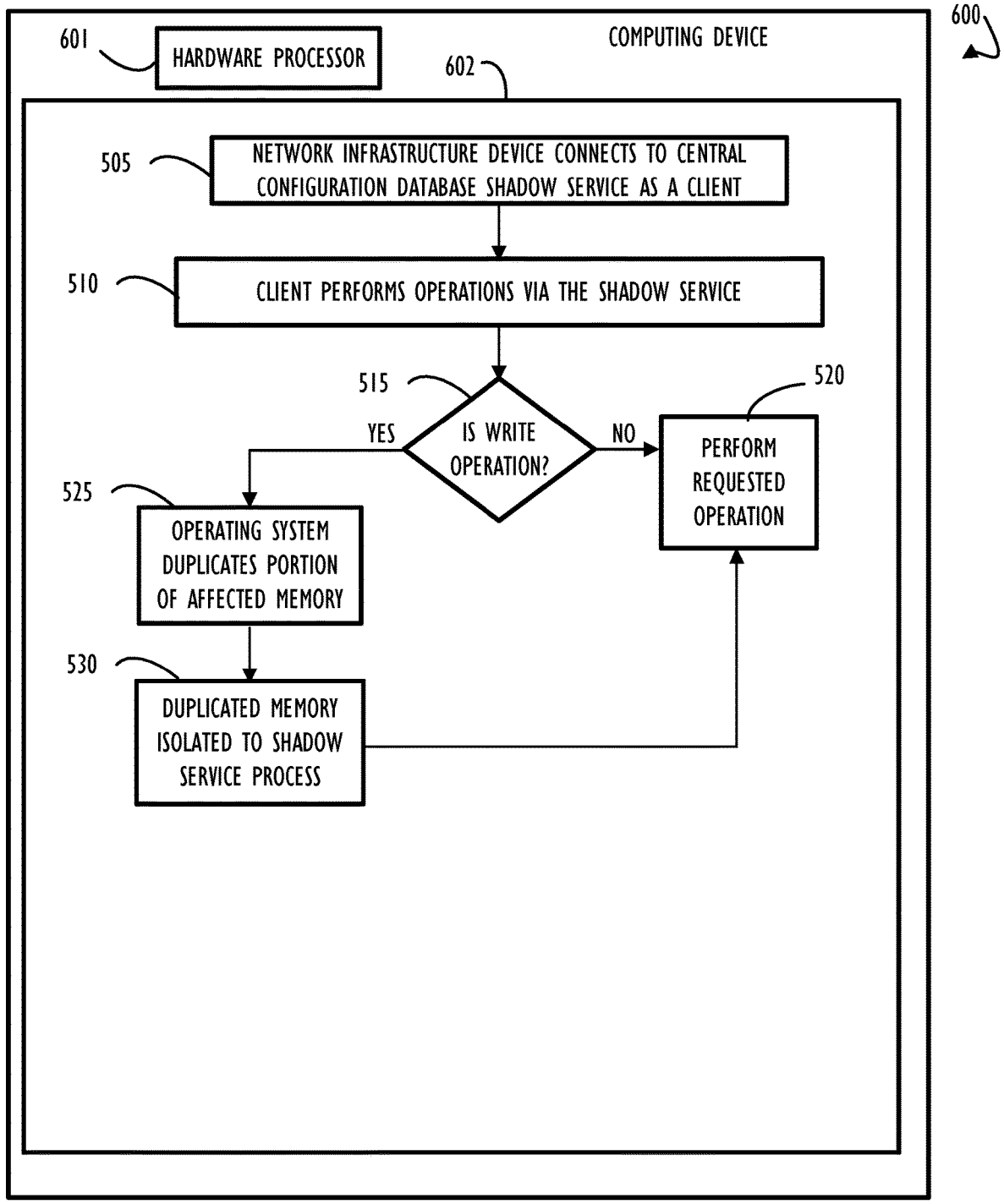
FIG. 6 is an example processor and computer-readable medium to implement an, infrastructure device utilizing a shadow copy of the centralized configuration database, according to one or more disclosed embodiments.

FIG. 6 is an example computing device 600, with a hardware processor 601, and accessible machine-readable instructions stored on a machine-readable medium 602 for implementing the creation of a shadow copy of the centralized configuration database, according to one or more disclosed example implementations. FIG. 6 illustrates computing device 600 configured to perform the flow of method 500 as an example. However, computing device 600 may also be configured to perform the flow of other methods, techniques, functions, or processes described in this disclosure. In this example of FIG. 5, machine-readable storage medium 602 includes instructions to cause hardware processor 601 to perform blocks 505-530 discussed above with reference to FIG. 5.

A machine-readable storage medium, such as 602 of FIG. 6, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory (EPROM), random access memory (RAM), non-volatile random access memory (NVRAM), optical disk, solid state drive (SSD), flash memory chips, and the like. The machine-readable storage medium may be a non-transitory storage medium, where the term "non-transitory" does not encompass transitory propagating signals.

Figure 7:
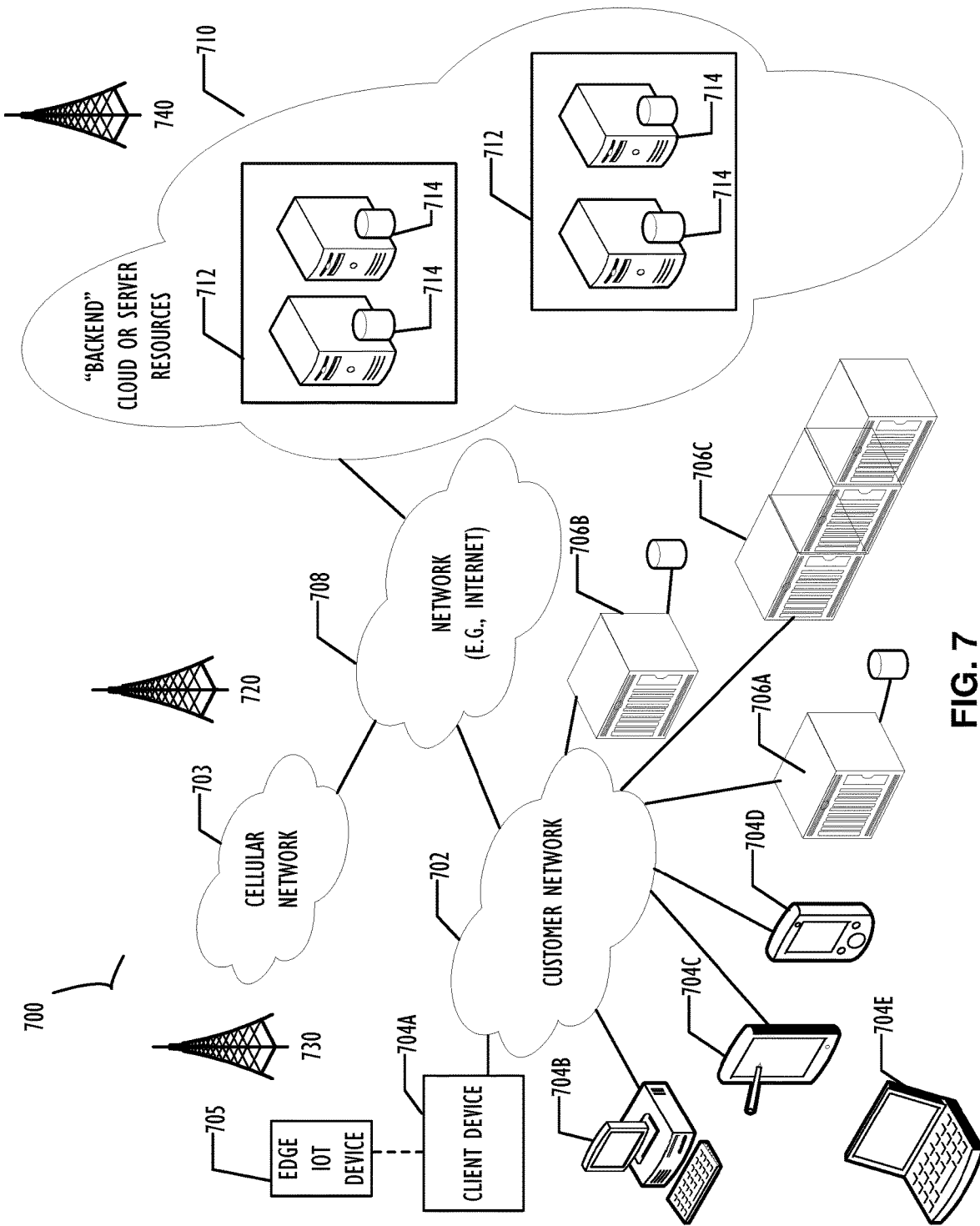
FIG. 7 represents a computer network infrastructure that may be used to implement all or part of the disclosed-technique for utilizing a shadow copy of a centralized configuration database, according to one or more disclosed embodiments.
Figure 8:
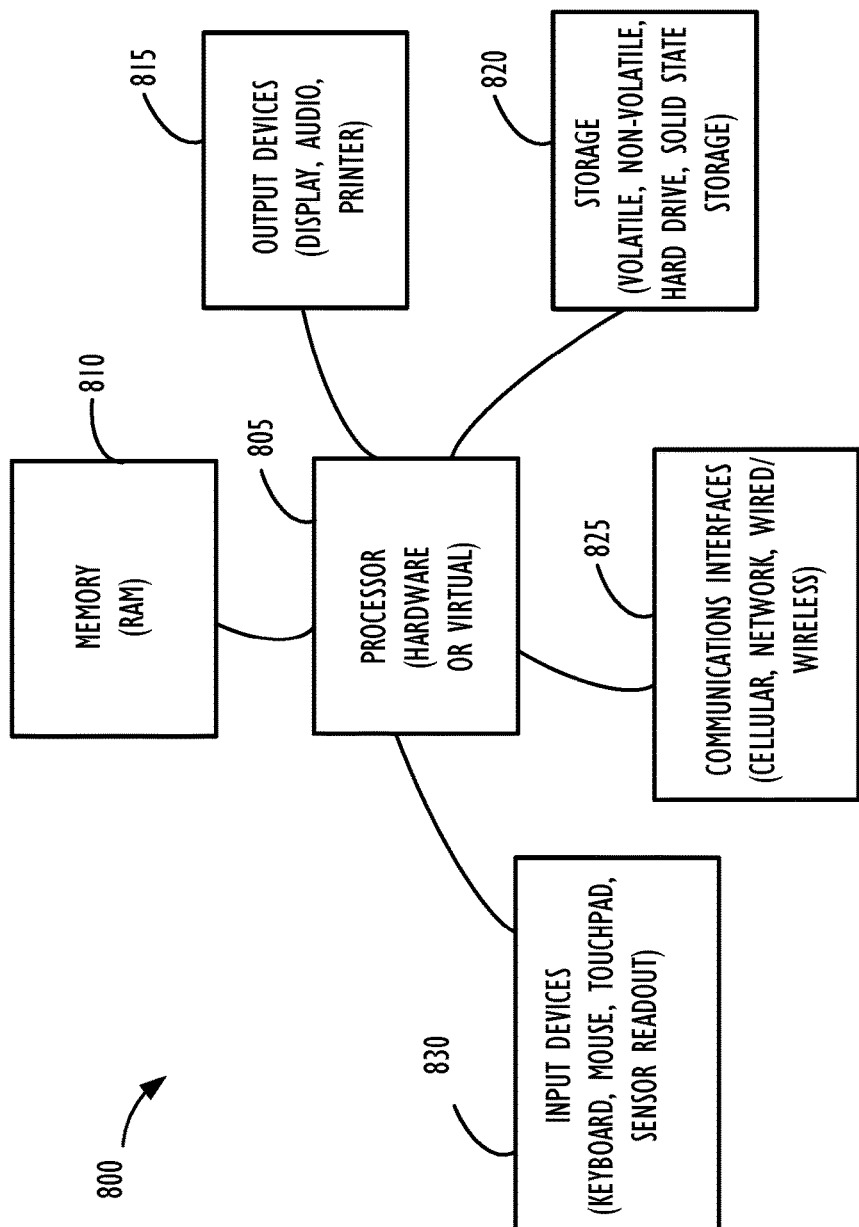
FIG. 8 illustrates a computing device that may be used to implement the functions, modules, processing platforms, execution platforms, communication devices, and other methods and processes of this disclosure.

FIG. 7 represents a computer network infrastructure 700 that may be used to implement all or part of the disclosed technique for utilizing a shadow copy of a centralized configuration database or provide information flow between a system performing the technique and other computer networks, according to one or more disclosed embodiment. Network infrastructure 700 includes a set of networks where embodiments of the present disclosure may operate. Network infrastructure 700 comprises a customer network 702, network 708, cellular network 703, and a cloud service provider network 710. In one embodiment, the customer network 702 may be a local private network, such as local area network (LAN) that includes a variety of network devices that include, but are not limited to switches, servers, and routers.

Each of these networks can contain wired or wireless programmable devices and operate using any number of network protocols (e.g., TCP/IP) and connection technologies (e.g., WiFi® networks, or Bluetooth®. In another embodiment, customer network 702 represents an enterprise network that could include or be communicatively coupled to one or more local area networks (LANs), virtual networks, data centers and/or other remote networks (e.g., 708, 710). In the context of the present disclosure, customer network 702 may include a network device snapshot method such as that described above.

As shown in FIG. 7, customer network 702 may be connected to one or more client devices 704A-E and allow the client devices 704A-E to communicate with each other and/or with cloud service provider network 710, via network 708 (e.g., Internet). Client devices 704A-E may be computing systems such as desktop computer 704B, tablet computer 704C, mobile phone 704D, laptop computer (shown as wireless) 704E, and/or other types of computing systems generically shown as client device 704A.

Network infrastructure 700 may also include other types of devices generally referred to as Internet of Things (IoT) (e.g., edge IOT device 705) that may be configured to send and receive information via a network to access cloud computing services or interact with a remote web browser application (e.g., to receive configuration information).

FIG. 7 also illustrates that customer network 702 includes local compute resources 706A-C that may include a server, access point, router, or other device configured to provide for local computational resources and/or facilitate communication amongst networks and devices. For example, local compute resources 706A-C may be one or more physical local hardware devices. Local compute resources 706A-C may also facilitate communication between other external applications, data sources (e.g., 707A and 707B), and services, and customer network 702.

Network infrastructure 700 also includes cellular network 703 for use with mobile communication devices. Mobile cellular networks support mobile phones and many other types of mobile devices such as laptops etc. Mobile devices in network infrastructure 700 are illustrated as mobile phone 704D, laptop computer 704E, and tablet computer 704C. A mobile device such as mobile phone 704D may interact with one or more mobile provider networks as the mobile device moves, typically interacting with a plurality of mobile network towers 720, 730, and 740 for connecting to the cellular network 703.

FIG. 7 illustrates that customer network 702 is coupled to a network 708. Network 708 may include one or more computing networks available today, such as other LANs, wide area networks (WAN), the Internet, and/or other remote networks, in order to transfer data between client devices 704A-D and cloud service provider network 710. Each of the computing networks within network 708 may contain wired and/or wireless programmable devices that operate in the electrical and/or optical domain.

In FIG. 7, cloud service provider network 710 is illustrated as a remote network (e.g., a cloud network) that is able to communicate with client devices 704A-E via customer network 702 and network 708. The cloud service provider network 710 acts as a platform that provides additional computing resources to the client devices 704A-E and/or customer network 702. In one embodiment, cloud service provider network 710 includes one or more data centers 712 with one or more server instances 714. Cloud service provider network 710 may also include one or more frames representing a scalable compute resource that may benefit from the techniques of this disclosure.

FIG. 8 illustrates a computing device 800 that may be used to implement the functions, modules, processing platforms, execution platforms, communication devices, and other methods and processes of this disclosure. For example, computing device 800 illustrated in FIG. 8 could represent a client device or a physical server device and include either hardware or virtual processor(s) depending on the level of abstraction of the computing device. In some instances (without abstraction), computing device 800 and its elements, as shown in FIG. 8, each relate to physical hardware. Alternatively, in some instances one, more, or all of the elements could be implemented using emulators or virtual machines as levels of abstraction. In any case, no matter how many levels of abstraction away from the physical hardware, computing device 800 at its lowest level may be implemented on physical hardware.

As also shown in FIG. 8, computing device 800 may include one or more input devices 830, such as a keyboard, mouse, touchpad, or sensor readout (e.g., biometric scanner) and one or more output devices 815, such as displays, speakers for audio, or printers. Some devices may be configured as input/output devices also (e.g., a network interface or touchscreen display).

Computing device 800 may also include communications interfaces 825, such as a network communication unit that could include a wired communication component and/or a wireless communications component, which may be communicatively coupled to processor 805. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication (PLC), WiFi, cellular, and/or other communication methods.

As illustrated in FIG. 8, computing device 800 includes a processing element such as processor 805 that contains one or more hardware processors, where each hardware processor may have a single or multiple processor cores. In one embodiment, the processor 805 may include at least one shared cache that stores data (e.g., computing instructions) that are utilized by one or more other components of processor 805. For example, the shared cache may be a locally cached data stored in a memory for faster access by components of the processing elements that make up processor 805. In one or more embodiments, the shared cache may include one or more mid-level caches, such as level 2 (L2), level 3 (L3), level 4 (L4), or other levels of cache, a last level cache (LLC), or combinations thereof. Examples of processors include but are not limited to a central processing unit (CPU) a microprocessor. Although not illustrated in FIG. 8, the processing elements that make up processor 805 may also include one or more of other types of hardware processing components, such as graphics processing units (GPU), application specific integrated circuits (ASICs), field-programmable gate arrays (FPGAs), and/or digital signal processors (DSPs).

FIG. 8 illustrates that memory 810 may be operatively and communicatively coupled to processor 805. Memory 810 may be a non-transitory medium configured to store various types of data. For example, memory 810 may include one or more storage devices 820 that comprise a non-volatile storage device and/or volatile memory. Volatile memory, such as random-access memory (RAM), can be any suitable non-permanent storage device. The non-volatile storage devices 820 can include one or more disk drives, optical drives, solid-state drives (SSDs), tap drives, flash memory, read only memory (ROM), and/or any other type of memory designed to maintain data for a duration of time after a power loss or shut down operation. In certain instances, the non-volatile storage devices 820 may be used to store overflow data if allocated RAM is not large enough to hold all working data. The non-volatile storage devices 820 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 805. In one embodiment, the compiling process of the software program may transform program code written in a programming language to another computer language such that the processor 805 is able to execute the programming code. For example, the compiling process of the software program may generate an executable program that provides encoded instructions (e.g., machine code instructions) for processor 805 to accomplish specific, non-generic, particular computing functions.

After the compiling process, the encoded instructions may then be loaded as computer executable instructions or process steps to processor 805 from storage device 820, from memory 810, and/or embedded within processor 805 (e.g., via a cache or on-board ROM). Processor 805 may be configured to execute the stored instructions or process steps in order to perform instructions or process steps to transform the computing device into a non-generic, particular, specially programmed machine or apparatus. Stored data, e.g., data stored by a storage device 820, may be accessed by processor 805 during the execution of computer executable instructions or process steps to instruct one or more components within the computing device 800.

A user interface (e.g., output devices 815 and input devices 830) can include a display, positional input device (such as a mouse, touchpad, touchscreen, or the like), keyboard, or other forms of user input and output devices. The user interface components may be communicatively coupled to processor 805. When the output device is or includes a display, the display can be implemented in various ways, including by a liquid crystal display (LCD) or a cathode-ray tube (CRT) or light emitting diode (LED) display, such as an organic light emitting diode (OLED) display. Persons of ordinary skill in the art are aware that the computing device 800 may comprise other components well known in the art, such as sensors, powers sources, and/or analog-to-digital converters, not explicitly shown in FIG. 8.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A computer device, comprising:
 a first network controller communicatively coupled to a first network;
 a first memory storage area comprising configuration database information, the configuration database information comprising information pertaining to a group of configuration parameters of the computer device and network information for the first network;
 a second memory storage area storing computer executable instructions; and
 a first processing unit communicatively coupled to the first network controller, the first memory storage area, and the second memory storage area, wherein the computer executable instructions, when executed by the first processing unit, cause the computer device to:
 receive a first request from a first client application at a primary database service process to access the configuration database information;
 responsive to the first request, create a shadow database instance to execute in parallel with the primary database service process, the shadow database instance comprising a shadow database control process and associated shadow database configuration information independently updatable from the configuration database information; and
 allow access and update to the shadow database instance from the first client application to validate a change to at least one configuration parameter selected from the group of configuration parameters or a portion of the network information, wherein the first processing unit maintains a plurality of shadow database instances for a plurality of client applications simultaneously, a first portion of the plurality of client applications are associated with remote infrastructure devices and a second portion of the plurality of client application are associated with local network communication components of the computer device.

2. The computer device of claim 1, wherein the first processing unit maintains a plurality of shadow database instances for a plurality of client applications simultaneously.

3. The computer device of claim 2, wherein each instance of the plurality of shadow database instances uniquely corresponds to a subset of the plurality of client applications and maintains segregation of updated data per subset.

4. The computer device of claim 1, wherein the instructions to cause the computer device to create a shadow database instance comprise instructions to execute an operating system level fork instruction.

5. The computer device of claim 4, wherein segregation of updated data for the shadow database instance is maintained using a copy on write capability of the operating system.

6. The computer device of claim 1, wherein the computer executable instructions further comprise instructions to cause the computer device to:
receive a second request to disassociate the first client application from the shadow database instance; and
responsive to the second request, free resources associated with the shadow database control process and associated shadow database configuration information.

7. The computer device of claim 6, wherein after completing execution of the second request, the computer system returns to a configuration consistent with configuration of the computer system prior to the first request.

8. The computer device of claim 1, wherein the first client application is associated with a remote network infrastructure device.

9. The computer device of claim 1, wherein at least one of the local network communication components of the computer device comprises a line card.

10. The computer device of claim 1, wherein the first request is received as an on demand request to create the shadow database instance.

11. The computer device of claim 10, wherein the first request is received via a command line interface connection to the computer device.

12. A computer-implemented method of validating a network configuration change on a network infrastructure device, the method comprising:
receiving a request from a first client application to access a central database containing operational parameters of the network infrastructure device and an associated network;
creating a shadow database instance of the central database, the shadow database instance including a shadow database control process and associated shadow database information segregated for update from the central database;
allowing access and update to the shadow database instance from the first client application to validate a change to at least one of the operational parameters;
receiving a second request to disassociate the first client application from the shadow database instance; and
responsive to the second request, freeing resources associated with the shadow database control process and associated shadow database information.

13. The computer-implemented method of claim 12, further comprising maintaining a plurality of shadow database instances for a plurality of client applications simultaneously.

14. The computer-implemented method of claim 13, wherein each instance of the plurality of shadow database instances uniquely corresponds to a subset of the plurality of client applications and maintains segregation of updated data per subset.

15. The computer-implemented method of claim 14, wherein data corresponding to information in the central database that remains unchanged is shared across all of the plurality of shadow database instances.

16. The computer-implemented method of claim 12, wherein creating a shadow database instance of the central database utilizes an operating system level fork instruction and maintaining segregation of data on update utilizes a copy on write capability of the operating system.

17. A non-transitory computer readable medium comprising computer executable instructions that, when executed by one or more processing units, cause the one or more processing units to:
receive a first request from a first client application to access a central database containing operational parameters of the network infrastructure device and an associated network;
create a shadow database instance of the central database, the shadow database instance including a shadow database control process and associated shadow database information segregated for update from the central database;
allow access and update to the shadow database instance from the first client application to validate a change to at least one of the operational parameters and
receive a second request to disassociate the first client application from the shadow database instance; and
responsive to the second request, free resources associated with the shadow database control process and associated shadow database information.

18. The non-transitory computer readable medium of claim 17, wherein the instructions to cause the one or more processing units to create a shadow database instance of the central database utilizes instructions to instruct the operating system to execute a fork instruction and the instructions to cause the one or more processing units to maintain segregation of data on update utilize instructions to invoke a copy on write capability of the operating system.

* * * * *